UNITED STATES PATENT OFFICE.

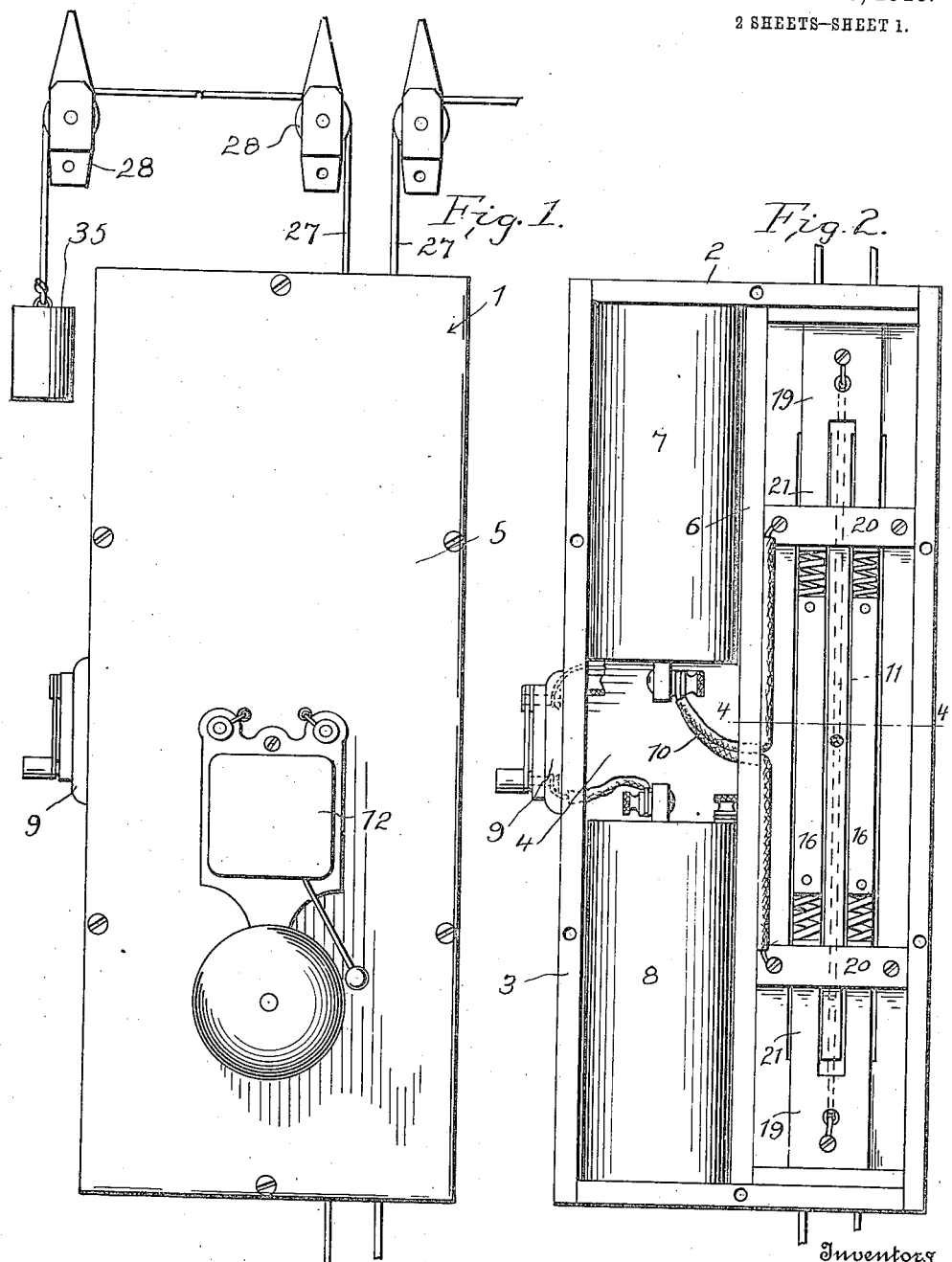

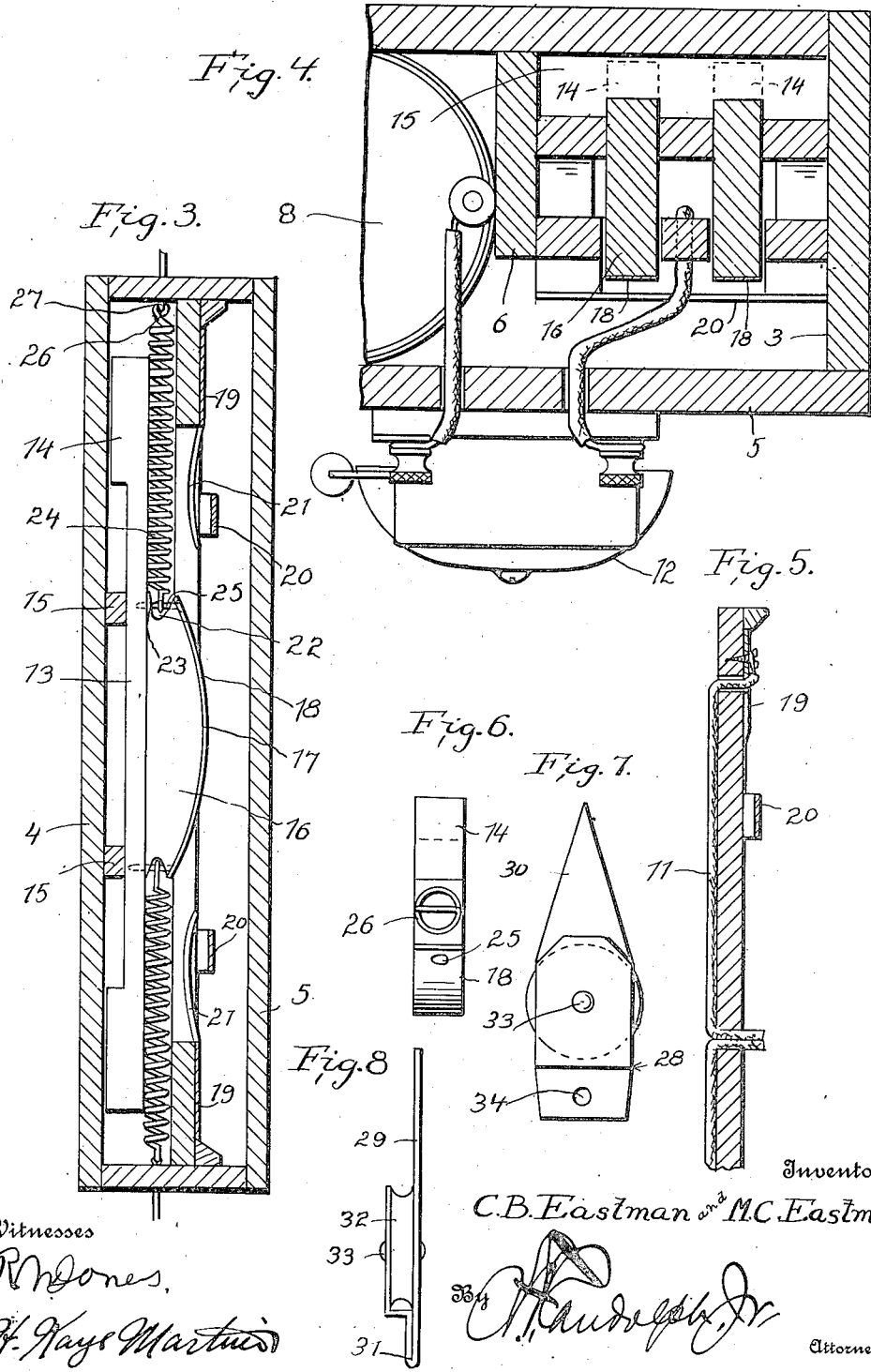

CHARLES B. EASTMAN AND MINOT C. EASTMAN, OF GEORGETOWN, MASSACHUSETTS.

FIRE-ALARM.

1,125,674.  Specification of Letters Patent.  Patented Jan. 19, 1915.

Application filed July 3, 1913. Serial No. 777,268.

*To all whom it may concern:*

Be it known that we, CHARLES B. EASTMAN and MINOT C. EASTMAN, citizens of the United States, residing at Georgetown, in the county of Essex and State of Massachusetts, have invented certain new and useful Improvements in Fire-Alarms; and we do hereby declare the following to be a full, clear, and exact description of the invention, such as will enable others skilled in the art to which it appertains to make and use the same.

This invention relates to new and useful improvements in automatic fire alarms, and has for its object to provide a device which will indicate a fire in any part of a building, by means of electrical connections.

Another object of our invention is to provide a device of the above character which may be connected to signal in several different places at the same time, should a fire occur in any part of a building.

Another object of our invention is to provide a casing having a source of electrical supply and the contact points therein, thus forming a compact device which may be located at any desirable point.

With the above and other objects in view, we will now proceed to describe our invention in the following specification and accompanying drawings, in which, Figure 1 is a view in elevation of our improved fire alarm, showing the bell in place; Fig. 2 is a view similar to Fig. 1, as it would appear with the front plate removed; Fig. 3 is a longitudinal sectional view taken on line 3—3 of Fig. 2; Fig. 4 is an enlarged transverse sectional view taken on line 4—4 of Fig. 2; Fig. 5 is a detail view of the wiring connections; Fig. 6 is a detail end view of one of the slides; Fig. 7 is a detail elevational view of the pulley; Fig. 8 is an edge view of the pulley.

Referring to the drawings by characters of reference, 1 indicates generally the casing forming the main part of our improved fire alarm. This casing preferably comprises the end walls 2, the side walls 3, the bottom 4 and the cover 5. Intermediate the side walls, we preferably provide a division wall 6, which separates the battery section from the contact section. This wall 6 extends longitudinally through the middle of the box and throughout its entire length.

A source of electrical supply, preferably batteries indicated at 7 and 8, respectively, is provided and adapted to pass through the switch indicated generally at 9, which may be of any preferred type. This switch, as clearly illustrated in Fig. 2 of the drawings, is interposed between the zinc pole of one cell and the carbon pole of the other cell, so that when the device is in operation the batteries are connected in series through the medium of the switch 9. The opposite terminals of the batteries are connected, as clearly illustrated in Fig. 2, through the circuit closers contained in the section of the box opposite the batteries. As will be clearly seen upon referring to Fig 2, the carbon pole of the cell referred to as 7 is connected through the medium of the wires 10 to the plates of the circuit closer. The spring contacts of the circuit closer which coöperate with the plates when the device is in operation are connected to the suitable line wire 11 which, in turn, is connected at its terminal with the alarm bell 12. The zinc terminal of the cell 8 passes directly forward and is connected directly to the bell 12, without passing through any circuit closers or other connections.

The circuit closing mechanism of our improved fire alarm preferably comprises a longitudinally slidable member 13, which is provided at each extremity with the L-shaped portions 14, these portions 14 being adapted to limit the longitudinal movement of the slide 13 by coming in contact with the transverse strips 15 secured to the bottom 4 of the box. A sliding block 16 is fixedly mounted upon the slide 13 and is provided upon its upper side with a cam surface 17, preferably segmental in contour and provided with a metallic plate 18. Each metallic plate 18 is adapted to contact at either end with a spring 19, through which the current on its way through the circuit closer passes. Each spring 19 coöperates with a plate 20, against which the finger 21 of the spring is pressed, by means of the metallic plate 18 carried on the sliding block 16. The ends of the sliding block are preferably recessed, as clearly illustrated at 22, and adapted to receive the ends 23 of the springs 24. A suitable pin 25 passes transversely through each recess 22 and is adapted to extend slightly beyond the extremity of the block 16 and into an aperture formed in the sliding member 13, as clearly illustrated in Fig. 3. This pin 25 is adapted to be surrounded by the end 23 of the spring 24 and hold the spring in operative relation to the sliding block 16. The end of the spring 24, opposite the end 23, is preferably provided with an eye 26 which is adapted to receive the end of the cord 27, by means of which the device is actuated. The cords 27 extend out of the box, as is clearly illustrated, and pass over the pulleys, indicated generally at 28, these cords being adapted to enter different parts of the building and have weights attached to their ends, by means of which they are kept at all times taut, so that at any time, should any cord extending from the springs 24, pulling against the tension of the weights be burned, said cord will be released and cause the sliding block of the circuit closer to press the spring fingers of the member 19 forward and into contact with the plate 20, thereby completing the circuit to cause the alarm bell to ring. The pulleys referred to generally as 28 are clearly illustrated in Figs. 7 and 8, and preferably comprise the body portion 29, having formed at one extremity thereof a point 30 which is adapted to be driven into the wall of a building. The opposite terminal of the body portion 29 is bent back upon itself, as clearly illustrated at 31, and forms a U-shaped member, as clearly shown in Fig. 8, between which the pulley 32 is rotatably mounted on its axle 33. A suitable aperture 34 is provided in the portion 31, and is adapted to receive a nail or tack, by means of which the device is more securely held in place.
In use, the box 1 is placed at any desired point in a building and the cords 27 pass outwardly therefrom, these cords 27 being carried along the ceiling, by means of the pulleys 28, and are provided at their terminals with weights 35 which are adapted to keep the cords taut at all times and also keep the springs 24 extended. It will be clearly seen that, should a fire break out in any part of the building and the cord burn through the springs will cause the cord to be pulled, thereby causing the cam face of the sliding block 16 to force one of the fingers 21 of the spring 19 forward and in contact with the plate 20, thus completing a circuit through the alarm bell and giving an alarm through the building.

While in the foregoing we have shown and described the preferred embodiment of our invention, we wish it to be understood that we may change the specific arrangements of parts without in any way departing from the spirit and scope of our invention.

Having thus fully described our invention, tion, what we claim is:—

1. In a device of the character described, a casing, a wall intermediate the sides of said casing and extending longitudinally therethrough, said wall adapted to form chambers, batteries located in one of said chambers, circuit closers in the other of said chambers, the negative pole of one of said batteries being connected with the circuit closers, a switch secured to the exterior of the casing and connected to the positive pole of the aforesaid battery, a bell secured to the front wall of said casing, one pole of said bell being connected to the positive pole of the second battery, the negative pole of the second mentioned battery being connected to the pole of the switch opposite the first mentioned pole, the pole of the bell opposite the one connected with the positive pole of the battery being connected with the circuit closer, whereby when said circuit closer is actuated the circuit through the bell, battery, circuit closer and switch will be complete.

2. A device of the character described including a casing, circuit closer within the casing, a pair of batteries within the casing, an electrically operated signal on the front of the casing, a switch on one of the side walls of the casing, a wire connecting one pole of one of the batteries to one pole of the switch, the opposite pole of said battery being connected to one pole of the second closer, a wire connecting the opposite pole of the circuit closer to one pole of the signal, a wire connecting the opposite pole of the signal to the pole of the second battery opposite the one to which the second closer is connected, and a wire connected to the opposite pole of the second battery to the remaining pole of the switch.

3. A device of the character described including a casing, a circuit closer within the casing, a pair of batteries within the casing, a switch on the casing, a bell on the casing, a wire connecting the positive pole of one of the batteries to one pole of the switch, a wire connecting the negative pole of the second battery to the switch, a wire connecting the negative pole of the first battery to one pole of the circuit closer, a wire connecting the remaining pole of the circuit closer to one pole of the bell, and a wire connecting the remaining pole of the bell to the positive pole of the second battery.

In testimony whereof we affix our signatures in the presence of two witnesses.

CHARLES B. EASTMAN.
MINOT C. EASTMAN.

Witnesses:
RUSSELL S. HYDE,
EDWARD F. McLAUGHLIN.